(12) United States Patent
Hollier et al.

(10) Patent No.: US 6,304,634 B1
(45) Date of Patent: *Oct. 16, 2001

(54) TESTING TELECOMMUNICATIONS EQUIPMENT

(75) Inventors: Michael P Hollier; Richard J Reynolds, both of Ipswich; Antony W Rix, Cambridge, all of (GB)

(73) Assignee: British Telecomunications public limited company, London (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/180,094
(22) PCT Filed: May 6, 1998
(86) PCT No.: PCT/GB98/01305
§ 371 Date: Nov. 2, 1998
§ 102(e) Date: Nov. 2, 1998
(87) PCT Pub. No.: WO98/53589
PCT Pub. Date: Nov. 26, 1998

(30) Foreign Application Priority Data

May 16, 1997 (EP) .................................................. 97303375
Dec. 10, 1997 (GB) .................................................. 9726125

(51) Int. Cl.[7] ..................................................... H04M 1/24
(52) U.S. Cl. ................. 379/22.02; 379/1.02; 379/10.01; 379/24; 379/27.03; 379/29.01
(58) Field of Search .................................. 379/1, 5, 6, 12, 379/22, 23, 24, 27, 29, 31

(56) References Cited

U.S. PATENT DOCUMENTS

| 4,847,885 | * | 7/1989 | Vittorelli | 379/6 |
|---|---|---|---|---|
| 5,410,585 | * | 4/1995 | Kawaharata et al. | 379/6 |
| 5,473,666 | * | 12/1995 | Szcrebak, Jr. et al. | 379/3 |
| 5,572,570 | * | 11/1996 | Kuenzig | 379/1 |
| 5,633,909 | * | 5/1997 | Fitch | 379/15 |
| 5,742,929 | * | 4/1998 | Kallman et al. | 704/251 |
| 5,809,108 | * | 9/1998 | Thompson et al. | 379/15 |
| 5,822,397 | * | 10/1998 | Newman | 379/6 |
| 5,933,475 | * | 8/1999 | Coleman | 379/1 |
| 5,940,472 | * | 8/1999 | Newman et al. | 379/1 |

\* cited by examiner

Primary Examiner—Binh Tieu
(74) Attorney, Agent, or Firm—Nixon & Vanderhye P.C.

(57) ABSTRACT

A communications system is tested to simulate a realistic conversation. A first measurement device make a call, through the system it is testing, to a second measurement device and the two devices converse using predetermined speech generated dynamically by each device in response to the signals received from the other, to simulate aspects of conversation over non-perfect communications system link. The progress of the conversation will therefore take different courses according to the quality of the link. For example, if an expected signal is detected by one device, it transmits an appropriate predetermined response to the other device. However, if the expected signal is corrupted, or not received at all, different predetermined responses (or no response at all) are transmitted to the other device. This in turn may cause the other device to repeat the original signal. Because all the responses, including those to poor quality signals, are predetermined, each device can readily determine the quality of the signals received, because each signal received by one device form the other must be one of a limited number of possible responses to the last transmission made by the one device to the other. The devices perform measurements on the sounds they receive from each other, and monitor the progress of the conversation to compute parameters describing aspects of the received signal quality.

38 Claims, 5 Drawing Sheets

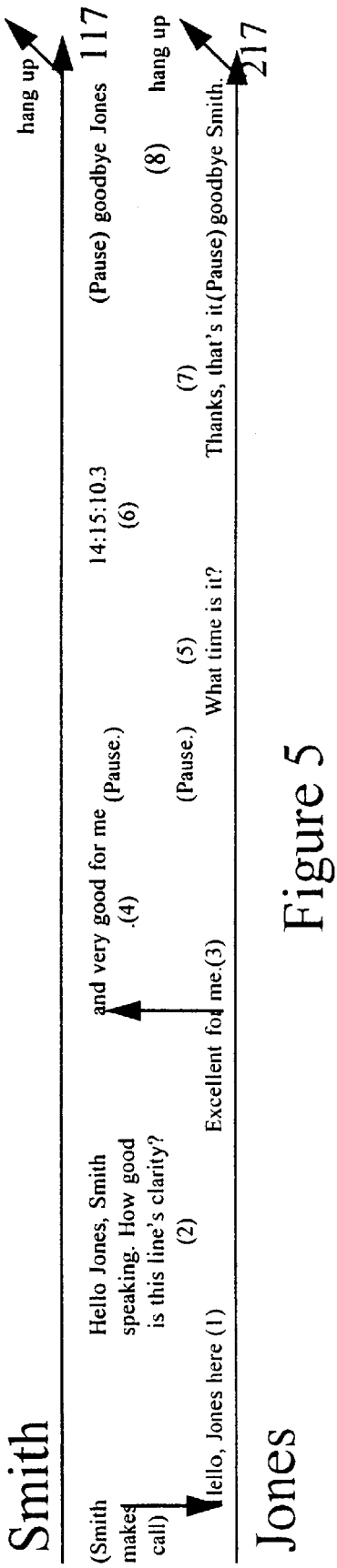
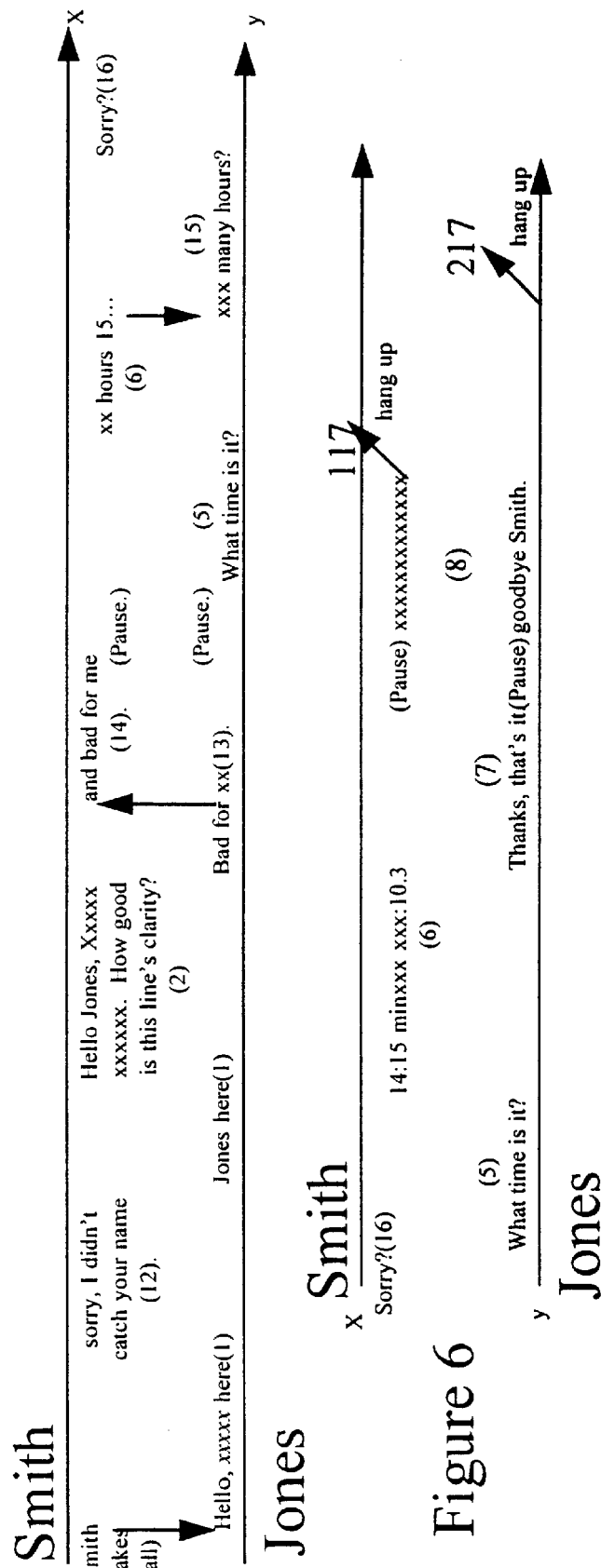
Figure 5
Figure 6

TESTING TELECOMMUNICATIONS EQUIPMENT

BACKGROUND OF THE INVENTION

1. Field of the Invention

This invention relates to the quality assessment of communications systems.

2. Related Art

In the increasingly liberalised telecommunications market, differentiation by quality is an important factor. The widespread installation of coding equipment in recent years has created the need for a new generation of assessment techniques. Conventional analysis assumes that the system is linear and time-invariant, and characterises it on the basis of delay, frequency response, noise level and noise spectrum. Modern networks exhibit far more complex effects and contain elements such as speech switches and compressive codecs that are highly non-linear and time varying.

Two main techniques are used in the industry to characterise the subjective quality of networks and their components. In listening tests a panel of subjects hear a series of sound clips that have been passed through simulated network conditions. Conversational tests require pairs of subjects to communicate through several simulated telephone links. In both cases the subjects are commonly asked to vote on a five point scale, from 'excellent' to 'bad'. Averaging across all subjects produces a mean opinion score (MOS) for each condition that mirrors the subjective quality of the network while reducing the random errors that appear in subjective voting.

The need to use a number of subjects for this kind of assessment makes the techniques expensive and hinders or prevents their application in the 'live' telephone network. It is therefore desirable to produce a tester that will automatically measure quality on the same scale, and that produces the same scores, within experimental error and subjective expectation, as the mean of several conventional subjective tests. As will be discussed later, assessment devices have been developed that can predict the listening quality of speech passing one way through the telephone network, and have been extended by using a variable speech level to estimate the conversational quality of a two way link.

The current state of research in this area is to perform a number of measurements on the communications system under test, such as echo, delay, or degradation of speech, and predict the system's quality from these measurements. However, these tests neglect the reactions of users to the system's behaviour, which in turn can influence the way the system performs.

Telecommunications companies have considerable experience in using human subjects to assess the subjective quality of a communications network. This knowledge has been built up through international groups, such as ETSI and the ITU: see, for example, *Methods for subjective determination of transmission quality*: ITU-T Recommendation P.800. Subjective assessment uses a panel of subjects, who vote on a number of candidate network conditions. Their votes are averaged and examined, and give information about the subjective quality of the networks. This method is valued because the scores are directly related to peoples' opinion of quality. In contrast, conventional engineering metrics such as signal-to-noise ratio do not in general correlate well with speech quality. The subjective tests relevant to the present invention may be classified as:

listening, where the subjects hear sections of speech that have been passed through test networks and vote on what they hear, and conversational, where two subjects talk to each other over candidate network connections and vote on the speech quality of each conversation.

Different questions prompt the subjects to vote on different aspects of their perception of the network, such as effort or quality.

Techniques have been developed (*Models for predicting transmission quality from objective measurements*: ITU-T P series recommendations: Supplement 3) to estimate the conversational quality of a conventional, linear, network using classical signal processing metrics such as echo delay and level. These measures rely on analysis of the network using artificial signals—usually sine waves or noise bursts—which may not be passed by a communications network designed for speech.

Models of human perception allow a more sophisticated analysis of the quality of speech transmitted by the network. Key features of the human senses, such as masking and threshold of hearing, are used to deduce whether errors in transmission are audible, and estimate their subjectivity. Higher level 'perceptual' processing takes further account of the amount and distribution of errors, and their coincidence with certain parts of speech. This computation allows the subjective mean opinion score that would be given by a series of subjective tests to be predicted. Such models are described in: ITU-T Recommendation P.861: *"Objective quality measurement of telephone-band* (300–3400 Hz) *speech codecs"*, and International Patent Applications WO94/00922 and WO95/15035.

The methods of conversational assessment described above may be used to weight perceptually-motivated quality measures to derive a perceptually-based estimate of conversational score. A system is described in the present Applicant's co-pending International Patent application (having the same filing date and claiming priority from the same two applications as the present application), which varies vocal level until an equilibrium is achieved, estimating listening effort, and then uses a conversational weighting based on echo and delay to estimate the quality of the connection for conversational speech.

There are good reasons for using artificially-generated speech-like signals, rather than recordings of human talkers, for testing a network designed to carry speech. In particular, artificial speech can be constrained to contain precisely defined phonemes, and are more easily reproducible to allow comparison of results. Artificial speech suitable for conversational testing is described in International Patent applications WO94/00922 and WO95/01011.

A dynamic conversational tester could take account of the change in certain properties of speech in hostile conditions. A description of these properties is given in International Patent application WO96/06495.

At the start of a call during which network quality is to be assessed, knowledge of certain network characteristics, such as delay and echo, is unavailable. However, these characteristics affect the conversational pattern. Furthermore, a fixed conversational pattern does not take into account the human response to losses in the line, such as noise, delay or freeze-out (the loss of a signal, for example due to capacity problems in the network, or delays in response to the start of a signal), which may be random in nature.

SUMMARY OF THE INVENTION

According to the invention there is provided a method of testing a communications system in which a first measurement device makes a call, through the system it is testing, to at least one second measurement device, and the devices converse using predetermined speech signals, and at least one of the devices performs measurements on the sounds it receives from the other device or devices, to compute one or more parameters describing aspects of the received signal quality, wherein the predetermined speech signals generated by each device are generated dynamically in response to the signals received by said devices, to reproduce aspects of conversation over a non-perfect communications system link.

This allows a dynamic response to events such as speech loss, mimicking the behaviour of humans communicating in the same conditions. Behaviour such as stand-off and recovery after loss, which will be described later, can also be incorporated. This allows the communications link to be evaluated in a more representative way than before. The signals may be assessed using a number of techniques to obtain measures that more accurately reflect the conversational quality of the system. In particular the quality of the communications system link can be determined in accordance with the information content and/or quality of the response signals received, and the actual progress of the simulated conversation.

In a preferred arrangement a device which does not clearly receive an expected signal from another device responds by transmitting a predetermined reply signal which, if received uncorrupted by the other device, will cause the other device to repeat the expected signal. (Of course, this reply may itself be corrupted in transmission, causing the other device in turn to respond in some other way than this intention).

Some of the signals to be generated for transmission in response to the input signals may be selected according to the quality of the received signals, and some may be signals requesting repetition of a received signal, selectable in response to poor quality of the received signal.

Properties such as the volume or speed of the response signals to be generated may be selected according to the quality of the received signals.

The individual devices may transmit and recognise device-specific identification signals forming part of the speech generated, such as spoken words, thus allowing the individual path under test to be identified.

The method may incorporate a system delay calculation process in which a first signal is transmitted from a first device to a second device, the second device receives the first signal and, after a predetermined delay, transmits a response signal to the first device, and the system delay is determined from the time of transmission of the first signal, the time of receipt of the second signal, and the predetermined delay. This process measures round trip delay. It is also possible to measure one-way delays between two of the devices having synchronised clocks, wherein one of the devices transmits to another device a signal indicative of the current time, and the delay in the system under test is determined by comparing the received time-indicative signal with the time of receipt.

The signals used may be pre-recorded samples of human speech or artificially-generated speech samples, representative of a plurality of different talkers.

In a preferred arrangement, one of the devices may transmit a signal simultaneously with another signal being received by the same device, such that corruption of one or other of the signals at its respective point of receipt can be detected.

The invention may be used for assessing the conversational quality of telephone and teleconference networks. It may be used on laboratory models of the networks, for example in the development of new equipment or in the planning of new networks, or for the assessment of a 'live' network, either installed at the customer premises, the local exchanges, or, via digital communications links, at central objective measurement site. Finally, the inclusion of a model of conversational state in the transmission system of the network would allow the network to deliver conversationally optimised speech under constraints such as limited bit rate.

In the case of a laboratory or planning assessment, the quality predictions would be used to support design decisions, probably in conjunction with a limited number of subjective tests. Assessment equipment installed in the network could be used to make test calls to monitor the quality of the core network, to assess the quality of a competitor's or any other interconnecting network, or to guarantee the quality of calls provided to a customer. Such equipment would pass results to a central monitoring location; in the case of malfunction it could raise alarms and provide diagnostic information to assist the rectification of faults.

Applications of conversational assessment are not limited to conventional telephony. The same techniques could be applied to other voice transmission systems, such as Internet phones or audio conference systems. Furthermore, the techniques could be employed to operate on the audio component of videophone, audio/visual teleconference systems, or shared communications environments such as virtual worlds.

It is envisaged that a model of the conversational state of two human talkers could be used in the network delivery infrastructure to ensure that, under constraints such as limited data rate, conversational quality could be optimised for a number of customers.

According to another aspect, there is provided a device for simulating a conversation over a communications system, comprising:
- a store for storing a plurality of signals forming a conversation
- a receiver for receiving signals from one or more complementary devices,
- a comparison device for comparing signals received by the receiver with signals stored in the store;
- selection means responsive to the comparison device for selecting from the store a signal for transmission to the complementary device or devices;
- transmission means for transmitting a signal selected by the selection means to the complementary device or devices.

A measurement system can be made up of any number of such devices. Two devices can be used to generate a simulated two-party conversation over a network. Three or more can be used to simulate a conference call. In laboratory conditions, it is possible for a single such device to act as both/all ends of the conversation, by connecting it to both/all ends of the equipment under test. In these circumstances, the device is acting as its own "complementary device", in the sense used above.

One of the devices has conversation initiating means for generating an initial signal for transmission by the transmission means. One or more of the devices have processing means for measuring the conversational quality of the communications system. The processing means may include means for monitoring the operation of the selection means to assess the progress of a conversation, and/or means for monitoring the quality of signals received from the complementary devices by the receiving means.

The selection means preferably has means to select different signals for transmission according to which of the predetermined signals is received, and according to the quality of the received signals. This means may be arranged to select a signal requesting repetition of a received signal in response to poor quality of the received signal.

The selection means may also have means to select properties of the signal to be transmitted according to the quality of the received signal.

The processing means may include means for monitoring the progress of the simulated conversation, and determining the quality of the communications system link thereby.

One of the devices may include delay calculation means comprising means for determining the time at which a first signal is transmitted to a complementary device, means for determining the time at which a predetermined response signal is received from the complementary device, means for retrieving from the store the value of a predetermined delay at the complementary device between receipt of the first signal and transmission of the response signal, and means for determining therefrom the additional delay imposed by the system under test.

Two or more of the devices may have synchronised clocks, wherein at least one of the devices has means for transmitting a signal indicative of the current time, and at least one other of the devices has means for determining the delay in the system under test by comparing the received time-indicative signal with the time of receipt.

The devices may have means for simultaneously transmitting and receiving predetermined signals, and means for detecting whether the predetermined received signal is corrupted by the presence of the transmitted signal.

The key measurement to be made on the network under test is the quality of conversational speech. This measurement depends on a number of different factors, such as:
subjective quality of speech;
side tone (the deliberately-imposed electrical coupling normally provided between the mouthpiece and earpiece of a telephone)
degradation of speech due to filtering and coding in each direction;
difficulty in communication caused by network characteristics such as:
  talker echo (the unwanted return of a signal to its point of origin, due to electrical mismatches in the system, or acoustic feedback at a remote handset),
  listener echo (multiple, temporally spaced, arrivals of the same signal), and
  freeze-out (failure to transmit part of a signal due to non-availability of the channel, delayed action of voice activity detectors, etc).

The assessment of these network characteristics requires two steps; firstly sending speech over the network, and secondly, receiving the speech signal at each termination and determining the subjective impact of the observed degradations in the received signal.

In this invention, the speech sent across the network is varied dynamically in response to the received signals using a conversational model.

However, because both devices have a predetermined set of responses to any signal (the response to be selected depending on what signal is received and the quality of that signal) the responses received by one device are indicative of the signal quality received by the other and the conversation is constrained, such that comparative measures are possible.

More specialised measurements may be performed at the same time to allow different degradations to be characterised for network diagnostics. The recordings of received speech, and knowledge of the speech that was sent (which is also available from the conversational model) are sufficient for these measurements, which include:
echoes from the local and the far end of the connection, or any intermediate points;
degradation due to the (time-varying) operation of echo cancellers;
loss or gain in speech loudness, and the variation of this loss with time and speech level;
clipping due to the imperfect operation of speech detectors, and the variation of clipping with speech level;
freeze-out (also known as dropout) due to instantaneous overloading in certain channels—a particular example is observed when intervals between speech are used to carry data packets: the beginning of an utterance may be lost as the system completes transmission of a packet;
noise, which may be due to electrical sources, or crosstalk with data or speech signals;
inability of the system to handle "double-talk" (the transmission of speech in both directions simultaneously.

The network under test is likely to contain elements specifically designed to operate with speech. For example, speech codecs are trained to code the different parts of speech well, but may behave erratically when passing non-speech signals such as tones or white noise. A further point of note is that the presence of non-speech signals such as tones may alter the properties of the system. In extreme cases certain tones may switch off echo cancellers or cause the system to clear the channel through for data traffic.

It is therefore advantageous that a system for assessing the quality of such a network for passing speech should use only speech or speech-like signals in its tests. This is not to say that the network should not be assessed for its ability to transmit tones (such as DTMF digits) and data, merely that this is a separate problem.

Certain properties of conversational speech depend on the quality of the transmission network. Vocal level and vocal tone change as a response to level or degradation of received speech. The conversational pattern is affected by characteristics such as delay, resulting in behaviours such as increased likelihood of double-talk and "false-starts", which occur when both parties start talking at about the same time, and one or both of them stop on realising that the other is also talking. Human talkers also go through processes of resynchronisation after speech has been lost or a false-start made. These properties may be included in the conversational model to ensure that artificial testing of the network is performed in a representative way.

Other aspects of variability in speech are significant in that they may induce different behaviour in the network and hence be degraded differently in transmission. Aspects of culture and talker characteristics may also cause changes in system performance. Although these effects are more complex than those listed above, their impact on subjective quality makes them worth considering. Example effects include: talker gender; language, grammar and vocabulary; formal or informal speech; information content—whether it is important that the speech is understood correctly; and talker assertiveness—determining the nature of the variation of vocal level with received level.

Account may be taken of these classes of variability by using several different conversational models to simulate different talkers and languages, to gain an overall quality assessment.

A number of the network characteristics described above may vary with time. For example, echo cancellers take a certain period of time to train; during this training period unexpected and confusing sounds may be heard, and account must be taken of this temporal variability and the higher-level perceptual implications of where in the conversational pattern the degradations occur.

BRIEF DESCRIPTION OF THE DRAWINGS

An embodiment of the invention will now be described, with reference to the Figures, in which:

FIG. 5 illustrates the progress of such a conversation in ideal conditions, FIG. 6 illustrates the progress of such a conversation in the presence of various line degradation conditions.

DETAILED DESCRIPTION OF THE EXEMPLARY EMBODIMENTS

Figure 1:
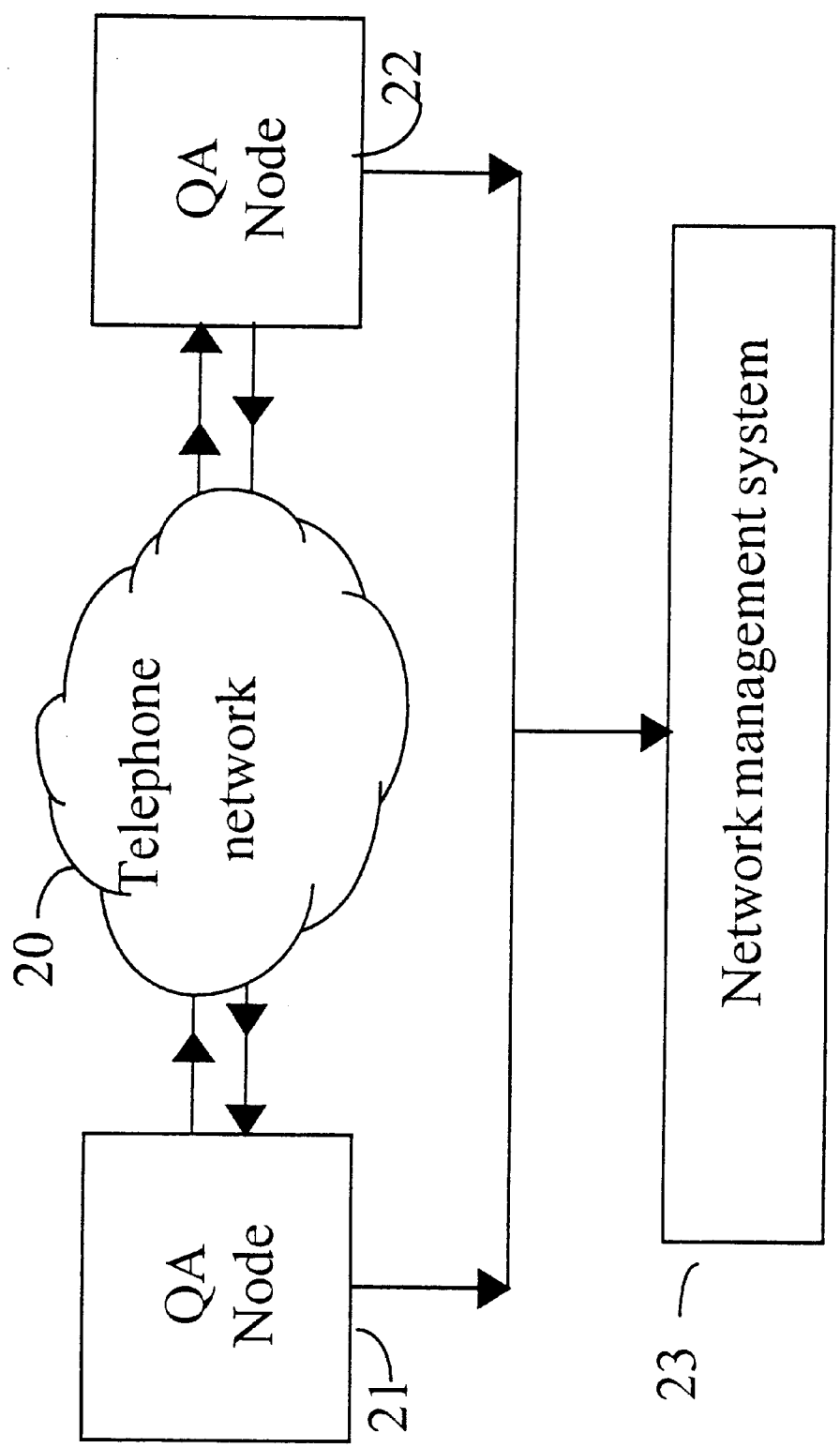
FIG. 1 is a schematic representation of a quality assessment system.

An outline structure for a quality assessment (QA) system with two devices is shown in FIG. 1. As shown in FIG. 1, at each termination 21, 22 of the network 20 under test there is located a measurement device or tester. One device (the 'originator') 21 sets up calls as appropriate and initiates a conversation with one or more receiving devices ('destinations') 22 (only one shown); assessment of an audioconference link would require one such device for each party to the call. Once conversation is initiated all devices 21, 22 etc behave in a similar way.

During the call the devices 21, 22 communicate through the network 20 using speech-like signals. The signals sent by each device are governed by a model of the conversation, which determines what is 'spoken' based on what has been received and an underlying state encoding the desired content ('conversational intent') of the call. Quality assessment is performed by at least one device, and preferably by all of them, based on the incoming speech and on knowledge of the signals that would have been sent by the other device or devices. It is possible but not necessary that this assessment be performed in real time, as the speech is received, but the received speech may be recorded and assessed subsequently. In order to obtain a comprehensive assessment of the quality of the link as a whole, the results of assessment carried out by each device can be transmitted to each other or to a network management centre 23, in order to combine the various measurements. The network management centre may display the quality measures to an operator, or may be arranged to act on the measures automatically, for example to re-route a call on which low quality is identified, or to alert maintenance staff.

Figure 2:
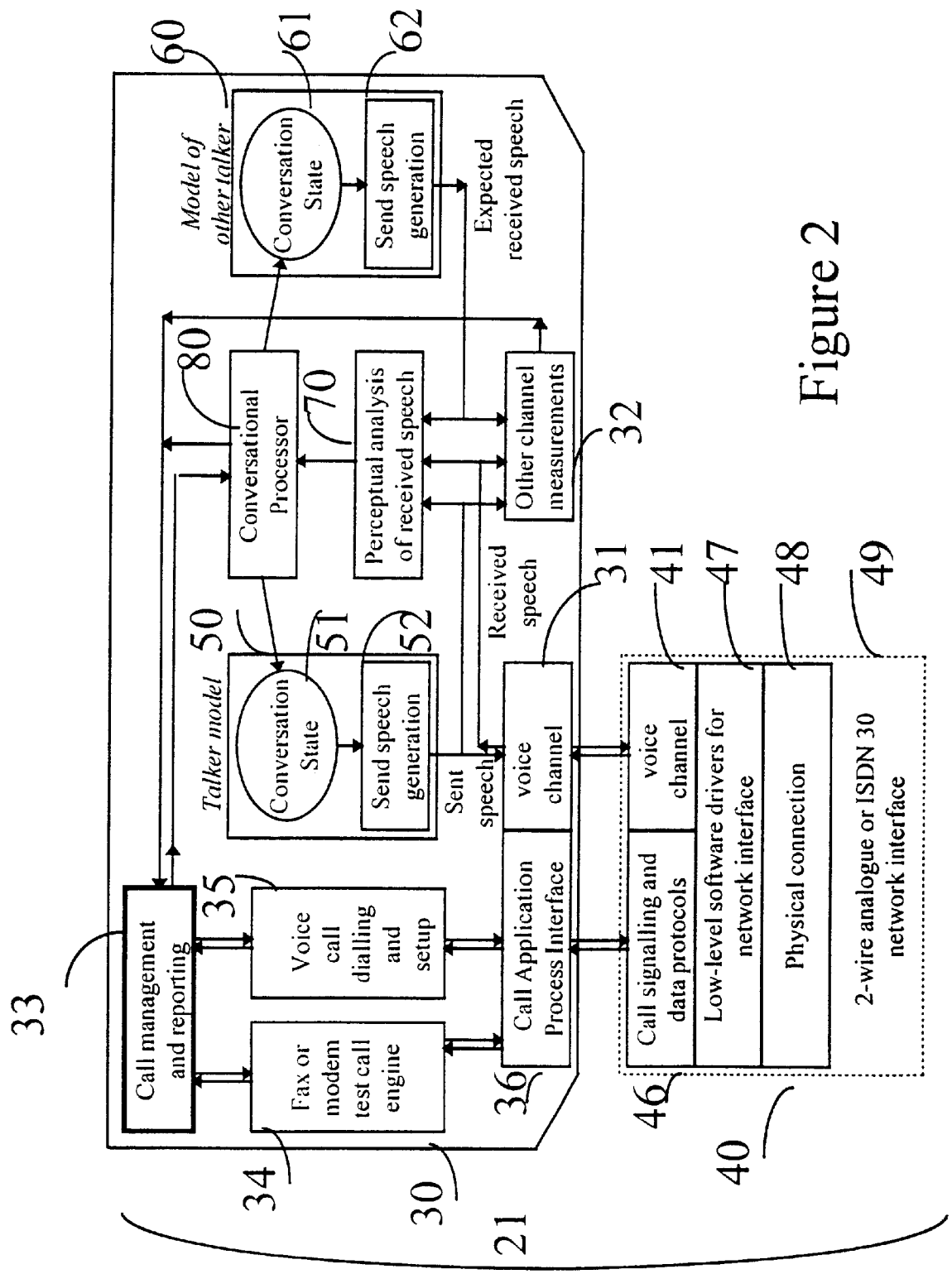
FIG. 2 is a schematic representation of the general arrangement of a conversational assessment device according to the invention.

Each device 21, 22 in a conversation has its own state: that is, a predetermined set of responses to given stimuli, which will vary according to which stimuli are received and the perceived quality of these stimuli. As shown in FIG. 2, each device 21, 22 has knowledge of the state (51, 61) of itself and the other device or devices. During a perfect conversation (with no loss or delay) each device 21, 22 would speak a pre-determined sequence of phrases or words, in response to phrases received from the other device. The state is defined more precisely to represent whether the device is listening, and the speech it will generate in different circumstances. After losses on the line the device will take steps to recover by performing a spoken re-synchronisation with the other devices. The state's variation ('state trajectory') is determined by a comparison between what is received and the expected signal, and by a pre-determined desired sequence of speech to pass between the devices ('conversational intent'). The model is therefore abstracted into two parts, a state (the current action) and a processor, which determines transitions in the state.

The comparison between received and expected speech is performed using an analysis of similarity such as the perceptual models previously described, taking into account factors such as echo, noise, and filtering of the signal. If the speech contains the expected sequence of sounds, within a defined amount of loss, the device either begins talking or continues to listen, dependent on the pre-determined conversational intent.

If something unexpected is heard (such as distortion, speech loss, or a predetermined recovery signal from another device or devices), recovery behaviour is initiated, again using a pre-determined sequence of sounds. The recovery behaviour may be recursive, continuing throughout a sustained loss in channel quality. The fact that recovery has been carried out may change certain features of the future conversational content of the call. The characteristics of received speech will also determine certain parameters of generated speech (such as vocal level and tone).

To assist in dealing in processing incoming signals, the speech communicated by each device may be labelled with a specific identity, just as human talkers can be identified from their speech. Devices may also identify themselves more clearly by name or a recognised identity sequence.

A model of conversational state as has just been described can be applied to the assessment of the conversational quality of a network as follows. One or more devices set up a call in which they may communicate with each other. Each has a different sequence of information to send to the other devices, and has prior knowledge of what it should hear in reply. The devices converse using a model of conversational state that allows them to communicate this information, and react to noise, echoes or loss on the line, in a predetermined way that is representative of human talkers. The key invention in this technique is this dynamic variation of speech, allowing the received signal to change what is to be generated in response. This allows a network connection to be realistically exercised to identify whether it would impair conversation, and rated accordingly.

The information (or desired speech sequence) to be communicated forms an idealised conversational pattern for each talker. This should contain a representative sample of different parts of speech, and reproduce the temporal structure and content of a typical conversation. The sequence should exercise conversational features such as interruption, double-talk and hand-over (the correct exchange of listening and talking functions between the two users). Knowledge of the quality of the line so far may be included in the information to be communicated, as will be illustrated in the worked example. Finally, the amount of spoken material to be used should also be representative.

Each device uses its own conversational state, and knowledge of the conversational state of the other device as acquired during the conversation, to determine what signals it is to send. The conversation will therefore exercise the system under test in a way that is representative for the system under test. The measurements described previously are performed, computing objective predictions of subjective parameters such as quality, as well as a number of other objective quantities such as echo characterisation.

A functional diagram of such a device is given in FIG. 2, using a layered form that separates the algorithmic model 30 from the network interface functions 40 for connection to a network 49, which may be 2- or 4-wire telephony, digital transmission systems such as ISDN or T1 or any other suitable system. The key elements of the device are:

the models of the talker 50 and other talkers 60, incorporating conversational state models 51 and 61, controlling speech generation processes 52 and 62;

perceptual analysis of the received speech 70, measured against sent and expected received speech;

a conversational processor 80 which controls the conversation states 51, 61 to determine the state trajectory and applies both the conversational intent (speech to be communicated in normal conversation) and recovery behaviour after losses, double-talk or other unexpected events on the line.

To discuss FIG. 2 in more detail, the algorithmic model 30 comprises the talker models 50, 60 which model the conversation state of each talker in the system (conversation state units 51, 61) in order to generate the speech for transmission (speech generation unit 52), and the speech which is expected to be received from the remote user (speech generation unit 62). The speech generated by the speech generation unit 52 is transmitted through a voice channel unit 31 to the network interface 40, through a corresponding voice channel unit 41, for transmission to the remote user. Signals received from the remote user are received from the network interface 40 and received through the voice channel 31 as received speech, and is processed by the perceptual analysis unit 70, as well as by a unit 32 which handles conventional channel measurements such as echo detection. In the perceptual analysis unit 70 the received speech is compared with the expected speech generated by the unit 52 in order to analyse the quality of the received speech, the results of which are processed by the conversational processor 80, which in turn updates the conversation states 51 and 61 in talker models 50 and 60. The conversational processor 80, and other channel measurements 32, control a call management reporting unit 33, which handles other functions such as fax or modem test calling (module 34) and the initial voice call dialling and set up functions 35, which interface with the network through an application processor interface 36.

The network interface 40 has a direct voice channel interface 41 for receiving signals from the voice channel 31 in the processor 30, and a call signalling and data protocol data handler 46 for interfacing with the application processor interface 36. These interfaces 41, 46 co-operate with a low level software driver 47 and thus with the physical connection 48 with the network interface 49.

Figure 3:
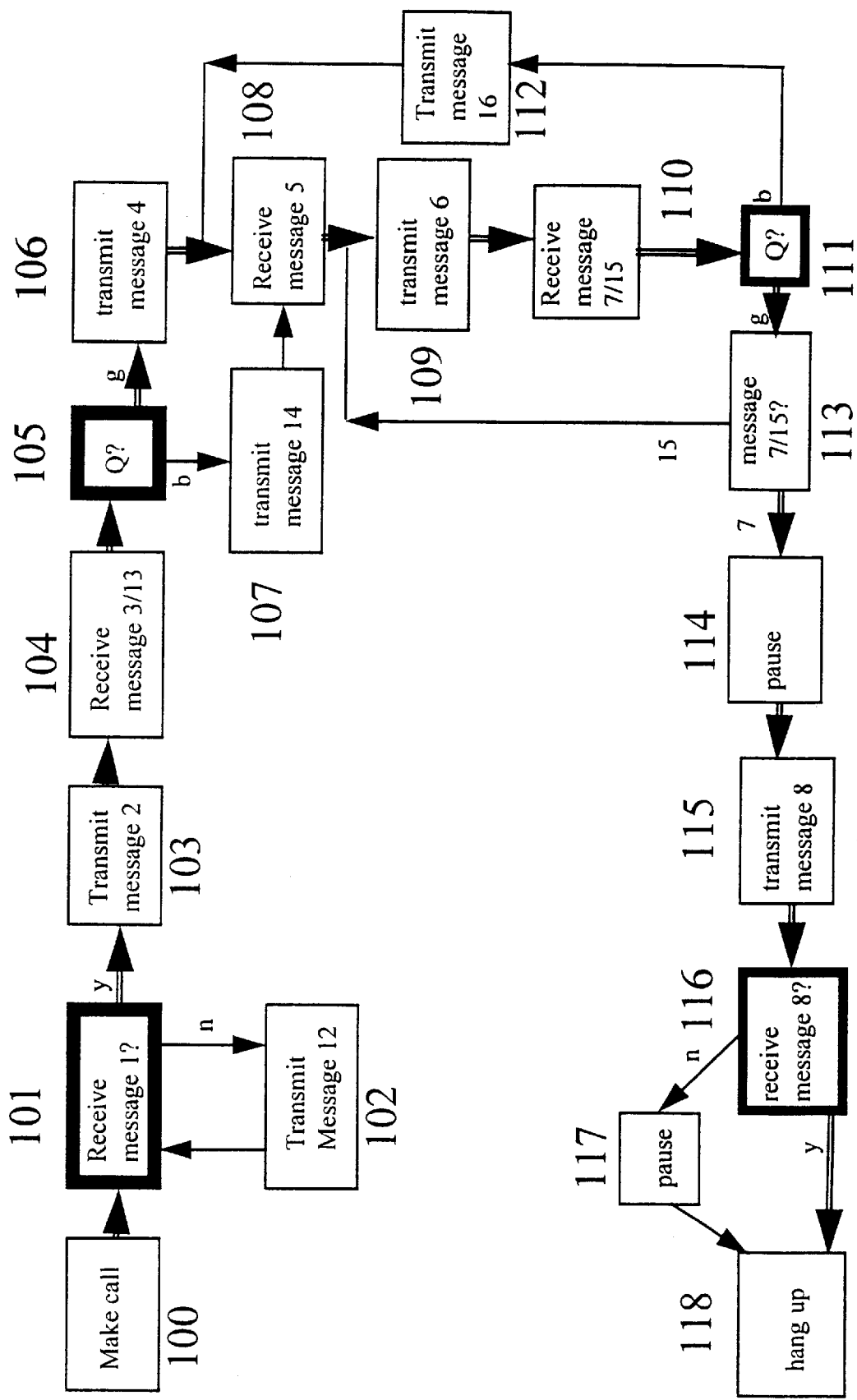
FIGS. 3 and 4 are flow diagrams illustrating the processes respectively performed by two such devices simulating a conversation.
Figure 4:
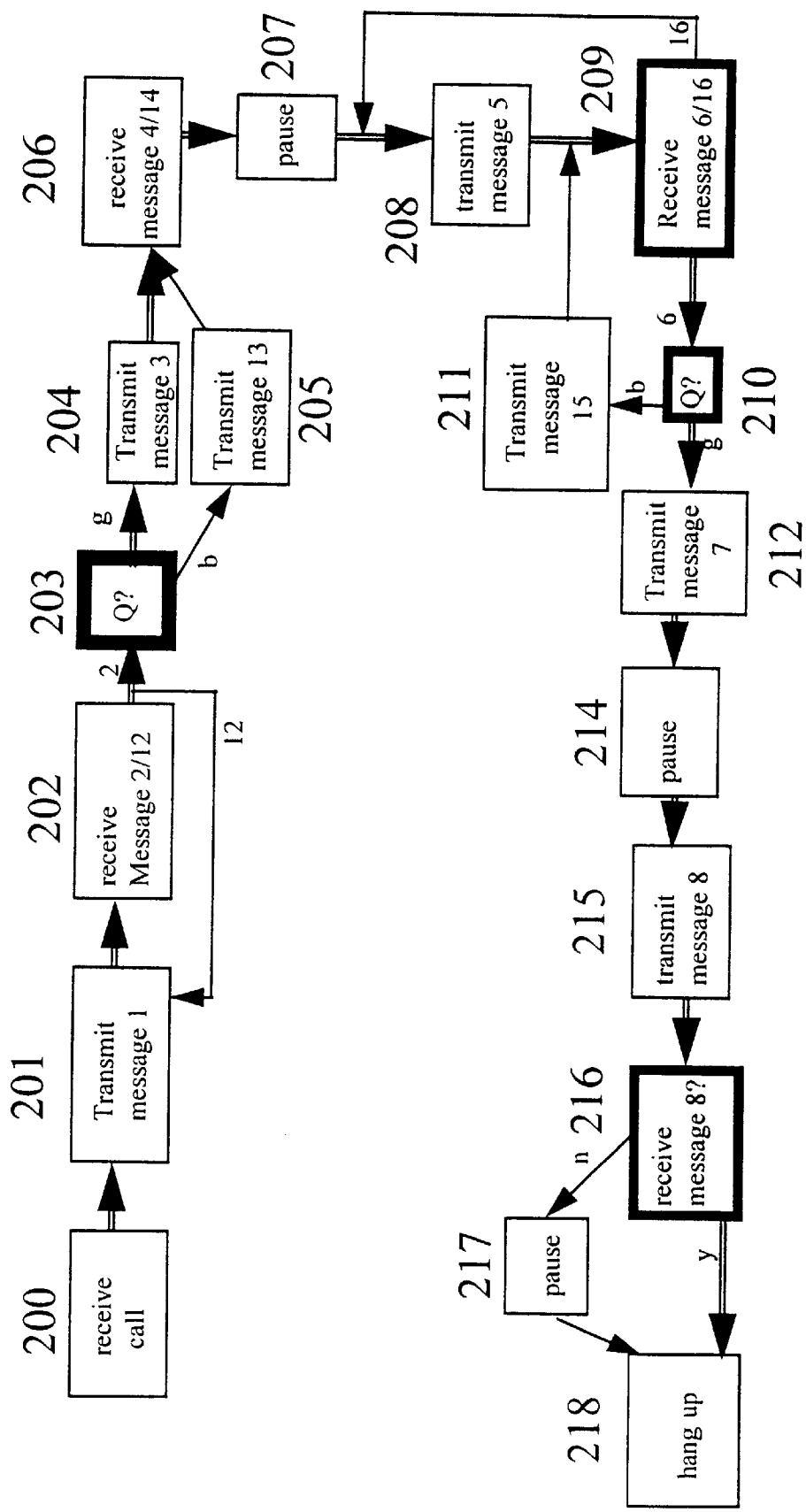

A simple example of the conversational assessment of a two-device link will now be described, with reference to FIGS. 3, 4, 5 and 6. FIGS. 3 and 4 are simplified flow charts showing how the conversation would progress in various circumstances as seen by the originator unit 21 and receiving unit 22 respectively. These flow diagrams merely illustrate the principles employed, and have been very much simplified from what would actually be required to emulate all possible fault conditions realistically. In particular, each step shows only two possible outcomes, but in practice there may be several.

FIG. 3 shows the processes carried out by the device 21, and FIG. 4 the processes carried out by the device 22, when interacting with each other. As can be seen, the conversation will take different courses according to the quality of the signals received by each device from the other. Certain steps, shown in bold outline, are indicative of points at which quality measures may be made. It should be noted however that all received messages may also be monitored generally for signal quality.

As shown in FIG. 3, the device 21 (which has the spoken identification signal "Smith") initiates a call (step 100) to the device 22 (which has the spoken identification signal "Jones"). The device 21 then waits to receive an expected message 1 from the device 22. In the next step, step 101, if the expected message is not received correctly, a message 12 is transmitted (step 102) in order to prompt the remote device 22 to resend the message. If message 1 is received correctly the device 21 transmits a second message 2 (step 103) and awaits a response from the remote device 22. The device 21 expects one of two responses (messages 3/13) from the remote device 22. The two messages are indicative of the signal quality received at the remote device 22. When this message is received (step 104) the signal quality of that message is assessed (step 105). Note that this step measures the quality of the signal received by device 32, independently of its content. The content of the signal (i.e. whether it is signal 3 or signal 13) is indicative of the quality received by the remote device 22. This may also be monitored at the device 21 by identifying which of the two signals 3/13 is actually received.

In response to the measured signal quality, a message 4 or 14 is transmitted (steps 106, 107) according to whether the signal quality perceived in step 105 is good or bad. This is arranged to interrupt message 3. This allows the system's response to "double-talk"—both parties speaking at once— to be monitored. A further message is then received from the remote unit 22 (message 5, step 108) in response to which the unit 21 transmits a further message 6 (step 109). In the next stage, a further message 7/15 is received (step 110). Its quality is then measured (step 111) in a similar manner to the step 105 already described and a message 16 is transmitted (step 112) if the quality of message 7/15 received in step 110 is poor. Following the transmission of message 16, the device returns to step 108 to await a repeat of message 5. However, if the quality of the signal received in step 110 (as assessed in step 111) is good, then a further step (113) is made to assess which of messages 7 or 15 was received in step 110. If the message received was message 15, the process returns to step 109, the transmission of message 6. However, if the message received in step 113 is message 7, then the system pauses (step 114) before transmitting a further message 8 (step 115), and receiving a complementary message 8 from the other system 22 (step 116). If no such message is received, the system awaits the sound of the other system hanging up (step 117) before itself hanging up (step 118). However, if message 8 is received, at step 116, the hang up process (118) happens straight away.

FIG. 4 shows the complementary processes happening in the device 22. The device 22 initially receives the call initiation from the device 21 (step 200) in response to which it transmits message 1 (step 201) and receives in response either message 2 or message 12 from the device 21 (step 202). The content of the signal (2/12) is indicative of the quality received by the remote device 21. This may be monitored at the device 22 by identifying which of the two messages 2 or 12 is actually received.

If message 12 is received, the device 22 re-transmits message 1 (step 201). However, if message 2 is received, the signal quality is assessed (step 203) and, according to the quality received, either a message 3 (step 204) or message 13 (step 205) is transmitted. The device 22 then receives, from the device 21, a message 4 or 14 generated by steps 106 or 107 above (step 206). The system then pauses (step 207) before transmitting a further message 5 (step 208) and the device 22 then receives from the device 21 one of two messages 6 or 16 (step 209). If the received message is message 16 then the device returns to step 208 to re-transmit message 5. However, if the message received is message 6, a quality assessment (step 210) is made. If the quality is assessed as bad, the device 22 transmits a message 15 (step 211) before returning to step 209 to await message 6 or 16 as appropriate from the device 21. However, if the quality measured in step 210 is asssessed as good, the device 22 transmits a message 7 to the device 21 (step 212) and then pauses (step 214) before carrying out a process analysis as described above for concluding the conversation (steps 215, 216, 217, 218, corresponding to steps 115, 116, 117 and 118).

In the following discussion of the process, the originator 21, named Smith, is denoted by bold text, and the destination device 22, Jones, by italic text. The information to be communicated—the expected conversation for a perfect link—is shown in FIG. 5 and summarised as follows: these steps are shown by double-lined arrows in FIGS. 3 and 4.

Smith makes call (step 100).

Jones answers. Hello, Jones here (message 1).

Hello Jones, Smith speaking. How good is this line's clarity? (message 2)

Excellent for me (message 3).

(Smith interrupts at start of 'me') and very good for me (message 4)

(Pause.) (step 207)

What time is it? (message 5)

Fourteen hours fifteen minutes and ten point three seconds (message 6).

Thanks, that's it (message 7).

(Pause.) (step 114/214)

(Simultaneously) goodbye Smith. goodbye Jones (message 8).

(Smith and Jones both hang up.) (step 118/218).

For a clear, instantaneous connection, the conversation would be as described above. In the case of a poorer quality line, with delay and heavy loss, the conversational model could give a conversation similar to the following example, illustrated in FIG. 6: speech lost by the channel (sent but not received) is marked below by overstriking and by 'x' in FIG. 6:

Smith makes call. (Step 100)

Jones answers.

Hello, Jones here. (message 1)

(Smith responds to loss) sorry, I didn't catch your name. (message 12)

Jones here. (message 1 repeated)

Hello Jones, Smith speaking. How good is this line's clarity? (message 2)

Bad for me. (message 13)

(Smith's interruption at start of 'me' causes its loss) and bad for me (message 14).

(Pause.) (step 207)

What time is it? (message 5)

Fourteen hours fifteen . . . (message 6)

(Jones interrupts)

how many hours? (message 15: double-talk causes loss of start of message)

Sorry? (message 16)

(Jones repeats question.) What time is it? (message 5)

Fourteen hours fifteen minutes and ten point three seconds. (message 6)

Thanks, that's it. (message 7)

(Pause.) (steps 114/214)

goodbye Smith. (message 8) goodbye Jones (Delay between devices, and network double-talk behaviour, causes loss).

Smith hangs up first (step 118);

Jones hears this (step 217) instead of the expected message 8 ("goodbye Jones"), then also hangs up (step 218).

This example illustrates the principal aspects of dynamic conversational testing. Loss of key information initiates a recovery. The first time this happens (message 1: 'Jones' lost by the channel) the recovery (step 102) gets the expected information across. The second time key information is lost ('Fourteen') (step 209), the initial recovery phrase 15 is itself garbled and the conversational state is set back (step 111), leading to a repeat of the original question (message 5: step 208). Several non-essential parts of speech are also lost; these do not initiate recovery but are taken into account in the overall assessment of signal quality.

The device 21 commences the transmission of message 4 (step 106/7) before message 3/13 (step 104) is complete. This allows the device to detect whether the quality of the remainder of message 3/13 is impaired by the double talk. 'Double talk' also occurs at step 211 when device 22 (message 15) interrupts message 6; this time it is the start of the new message 6 which is impaired. Finally, the network delay and resulting double-talk behaviour of the network causes Smith's 'goodbye Jones' (message 8: step 114) to be lost; Smith hangs up (step 117) on hearing the expected 'goodbye Smith' (step 215), but Jones only hears the line go dead (step 210). As recovery is no longer an option, Jones also hangs up (step 217).

As well as measurements of speech quality and loss during the conversation, both devices are able to compute other characteristics of the channel. Talker echo, and the operation of echo cancellers on the line, is calculated by comparing the spoken and received signals when each device is talking. Delay can be calculated from the increase in the time taken for a reply to be heard over the time for an instantaneous connection; additionally, with synchronised clocks, Jones is able to measure the one-way delay from speaking to reception using the time as spoken by Smith, though the processing of this would take place after the conversation has ended.

What is claimed is:

1. A method of testing a communications system, said method comprising:

making a call with a first measurement device through a system to be tested, to at least one second measurement device, causing the devices converse using predetermined speech signals simulating human conversational behavior, and performing measurements with the first measurement device on the speech signals it receives from the second measurement device, and computing one or more parameters describing aspects of the received signal quality, wherein the predetermined speech signals generated by each device are generated dynamically in response to the signals received by said devices, to simulate aspects of human conversational behavior over a non-perfect communications system link.

2. A method according to claim 1, in which one of the devices responds to failure to clearly receive an expected signal from another of the devices by transmitting a predetermined reply signal, intended to cause the other device to repeat the expected signal.

3. A method according to claim 1, wherein at least some of the generated signals are generated for transmission in response to the received signals and are selected according to the quality of the received signals.

4. A method according to claim 3, wherein at least one of the response signals selectable is a signal requesting repetition of said received signals, said at least one of the response signals being selectable in response to poor quality of the received signals.

5. A method according to claim 3, wherein the properties of the response signals to be generated are selected according to the quality of the received signals.

6. A method according to claim 3, wherein the quality of the communications system link is determined in accordance with the progress of the simulated human conversational behavior.

7. A method according to claim 6, wherein the quality of the communications system link is determined in accordance with the information content and/or quality of the response signals received.

8. A method according to claim 1, wherein the devices transmit and recognise device-specific identification signals forming part of the speech signals generated.

9. A method according to claim 1, including a system delay calculation process in which a first signal is transmitted from said first measurement device to said second measurement device, the second measurement device receives the first signal and, after a predetermined delay, transmits a response signal to the first measurement device, and a system delay is determined from the time of transmission of the first signal, the time of receipt of the second signal, and the predetermined delay.

10. A method according to claim 1, including a system delay calculation process in which the first and second devices have synchronised clocks, wherein the first device transmits to the second device a signal indicative of a current time, and a delay in the system under test is determined by comparing a received time-indicative signal with the time of receipt.

11. A method according to any of claim 1, wherein the signals used are pre-recorded samples of human speech.

12. A method according to any of claim 1, wherein the signals used are artificial samples of human speech.

13. A method according to claim 11, wherein the signals used are representative of a plurality of different talkers.

14. A method according to claim 1, in which the measurements made are used to control the operation of the communications system.

15. A method according to claim 1, in which one or more of the devices transmit a signal simultaneously with another signal being received by the same device, such that corruption of one or other of the signals at its respective point of receipt can be detected.

16. A method according to claim 1, wherein the human conversational behavior that is simulated is one or more of the following human conversational behaviors: stand off, recovery after loss, conversation interruption, double-talk and hand-over.

17. A device for simulating a human conversational behavior over a communications system, comprising:
    a store for storing a plurality of speech signals forming portions of simulated human conversational behavior,
    a receiver for receiving simulated human conversational speech signals from one or more complementary devices, the one or more complementary devices being external to said device for simulating conversational behavior;
    a comparison device for comparing the signals received by the receiver with signals stored in the store;
    selection means responsive to the comparison device for selecting from the store a signal respectively corresponding to a simulated human conversational response for transmission to the complementary device or devices;
    transmission means for transmitting a simulated human conversational response signal selected by the selection means to the complementary device or devices.

18. A device according to claim 17, having conversation initiating means for generating an initial signal for transmission by the transmission means.

19. A device according to claim 17, having processing means for measuring the conversational quality of the communications system.

20. A device according to claim 19, wherein the processing means includes means for monitoring the operation of the selection means to assess the progress of said human conversation behavior.

21. A device according to claim 19, wherein the processing means includes means for monitoring quality of signals received from the complementary devices by the receiver.

22. A device according to claim 19, wherein the processing means includes means for monitoring the progress of the simulated human conversational behavior, and determining the quality of the communications system thereby.

23. A device according to claim 16, wherein the selection means has means to select different signals for transmission according to the quality of the received signals.

24. A device according to claim 23, wherein the selection means has means to select a signal requesting repetition of a received signal in response to poor quality of the received signal.

25. A device according to claim 21, wherein the selection means has means to select properties of the signal to be transmitted according to the quality of the received signal.

26. A device according to claim 16, wherein the selection means has means to select different signals for transmission according to which of the predetermined signals is received.

27. A device according to claim 26, wherein the selection means has means for responding to a predetermined received signal by reselecting the signal previously transmitted by the transmission means.

28. A device according to claim 17, wherein the transmission means transmits an identification signal as part of the transmitted signal.

29. A device according to claim 17, wherein the device has means to recognise identification signals specific to an individual member of a plurality of complementary devices transmitting the speech signals received by the receiver.

30. A device according to claim 28, wherein the identification signals are spoken words.

31. A device according to claim 16, having means for simultaneously transmitting and receiving predetermined signals, and means for detecting whether the predetermined received signal is corrupted by the presence of the transmitted signal.

32. A device according to claim 11, including delay calculation means comprising means for determining the time at which a first signal is transmitted to said complementary device, means for determining the time at which a predetermined response signal is received from the complementary device, means for retrieving from the store a value of a predetermined delay at the complementary device between receipt of the first signal and transmission of the response signal, and means for determining therefrom an additional delay imposed by the system under test.

33. A method according to claim 17, wherein the human conversational behavior that is simulated is one or more of the following human conversational behaviors: stand off, recovery after loss, conversation interruption, double-talk and hand-over.

34. A measurement system for assessing the quality of a communications system by simulating human conversational behavior between human talkers, the system comprising:

first and second devices connected to the system under test at appropriate points for the initiation of a call and transmission of speech signals;

the first and second devices having means to generate predetermined simulated human conversational patterns which vary dynamically in a way that is representative of human speech, such that the speech signals generated at the first device varies dynamically in response to the signals received at the first device from the second device, and the first device having processor means to extract a number of different quality parameters from the received simulated human speech signals from the second device.

35. A measurement system according to claim 34, the first device comprising:

a store for storing a plurality of signals forming a simulated human conversation;

a receiver for receiving signals from said second device, a comparison device for comparing signals received by the receiver with signals stored in the store;

selection means responsive to the comparison device for selecting from the store a signal for transmission to the second device;

transmission means for transmitting signal selected by the selection means to the second device.

36. A measurement system according to claim 32, wherein two or more of the devices have synchronised clocks, wherein at least one of the devices has means for transmitting a signal indicative of the current time, and at least one other of the devices has means for determining the delay in the system under test by comparing the received time-indicative signal with the time of receipt.

37. A method according to claim 34, wherein the human conversational behavior that is simulated is one or more of the following human conversational behaviors: stand off, recovery after loss, conversation interruption, double-talk and hand-over.

38. A method for measuring the quality of a communications circuit, said method comprising:

automatically generating and sending human conversational dialog speech signals bi-directionally between a first measurement device and a second measurement device over a communications circuit to be tested; and dynamically changing, using the first measurement device, the course of said automatically generated conversational dialog as a function of the quality of speech signals being received at said first measurement device from said second measurement device over the tested communications circuit.

\* \* \* \* \*